P. J. Jamet,
Tackle.
No. 46,034.   Patented May 30, 1865.
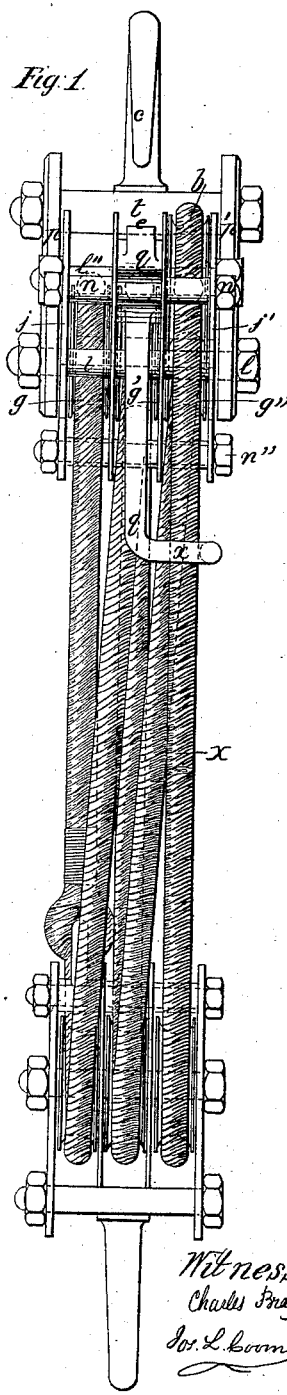
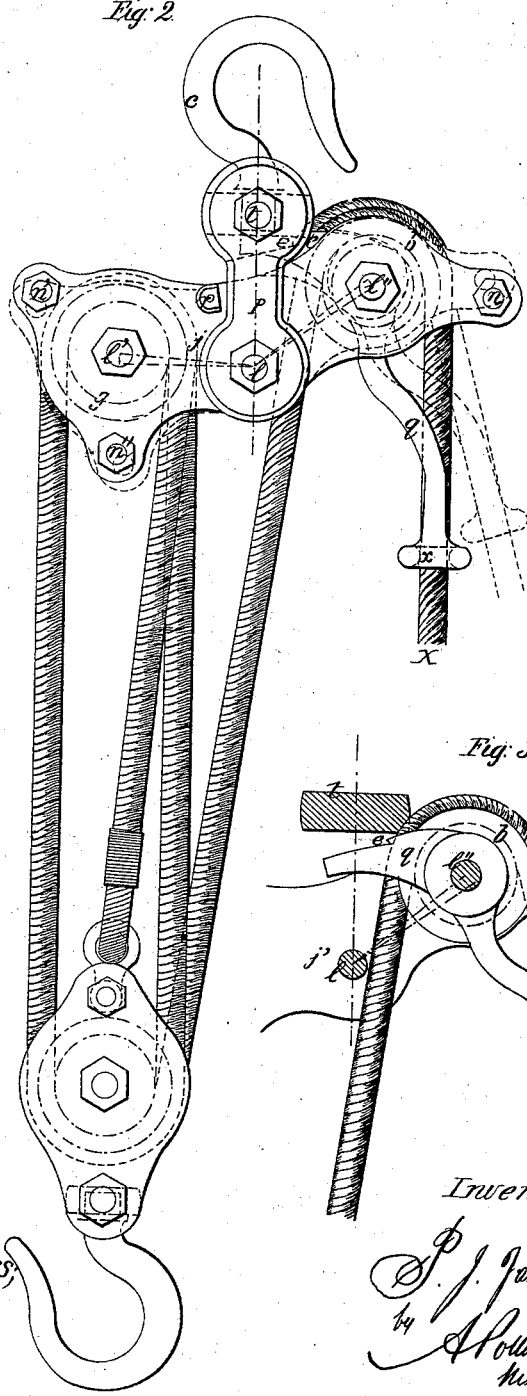
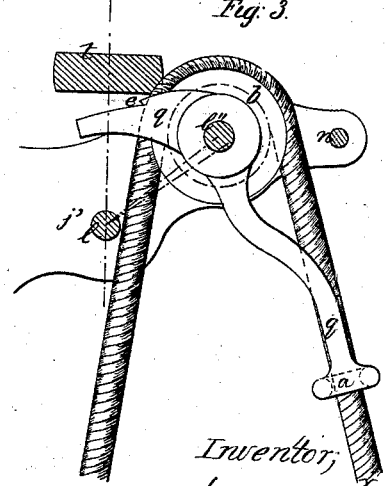
Witnesses:
Charles Bray.
Jos. L. Coombs
Inventor;
P. J. Jamet
by A. Pollok
his atty.

UNITED STATES PATENT OFFICE.

PIERRE JOSEPH JAMÉT, OF PARIS, FRANCE.

IMPROVEMENT IN SAFETY-TACKLE.

Specification forming part of Letters Patent No. 48,034, dated May 30, 1865.

*To all whom it may concern:*

Be it known that I, P. J. JAMÉT, of Paris, in the Empire of France, have invented certain new and useful Improvements in Safety-Tackle; and I hereby declare that the following is a full, clear, and exact description of the same, reference being had to the accompanying drawings.

The object of my invention is the construction of a tackle possessing the advantage of holding in suspension a load at any given elevation without securing or tying the cord upon which the operator pulls, and this is accomplished by means of a vibratory frame or block hung in a suitable link of the stationary hook and by means of a lever or brake.

In the accompanying drawings, Figure 1 is a side view, Fig. 2 a front elevation, and Fig. 3 a detail view, of my improved tackle.

The movable block may be constructed in the ordinary or in any suitable manner. The stationary block is composed of a suspension-hook, C, pivoted on a cross-head, $t$, which unites the two pendent side links, $p\ p'$. The hook proper is common to all tackles. Between the two links $p$ and $p'$, and upon a central pin or axle, $l$, is hung the frame J J' of the sheaves, and is composed of two plates united together by means of stay-bolts $n\ n'\ n''$. These two plates thus arranged are capable of oscillation upon their point of suspension at $l$ to the extent determined by a stop, $r$, and as shown in Fig. 2. The sheaves or pulleys $g\ g'\ g''$, which support the load, are mounted upon an axle, $l'$, on the left side of the links $p$, and the rope or cord passes over another pulley or sheave, $b$, on the right side of the link, and mounted upon an axle, $l''$, so that on pulling upon the cord or rope X the frame J will be brought into position indicated in black lines, and when released assume the position indicated in blue lines, and thus produce oscillation at each pull on the rope. It is this oscillatory movement which enables me to stop at pleasure, as though with a brake, the backward movement of the pulleys when actuated by the weight of the load to be hoisted and when the strain on the rope is released. In Fig. 3 the position of the pulley $b$ in relation to the cross-head is that indicated in blue lines in Fig. 2. The cord or rope passing around the sheave or pulley $b$ is pinched or compressed between the pulley and a recess or gorge formed in the cross-head $t$ with a force proportionate to the weight to be raised. It will be understood that on again pulling on the cord X the frame will be caused to assume the position in black lines and the load to ascend. Upon the pin or axle $l'$ is arranged a cam-lever, $q$, the office of which is to allow the weight or load or movable pulley to descend, should that be necessary. To this effect the lever at its upper end is provided with a cam, the shoulder $e$ of which, when engaged with the edge of the cross-head $t$, prevents brake action or the cord being bound as before described. This cam is operated by means of the curved shank of the lever, the lower end of which is formed into an eye, $x$, through which the cord X passes. When, therefore, it is desired to allow the weight to descend, the shank is drawn by means of the cord, so that the shoulder or notch $e$ falls in with the edge of the cross-head. This kind of tackle is applicable to the lifting of weights of all sorts on board of ships, in wells, upon scaffolding or derricks, &c.

Having now described my said invention, I claim—

1. The construction, substantially as herein described, of a safety-tackle for the purpose of holding or maintaining weights in suspension during the intervals of pull.

2. The oscillating frame or block under the arrangement described, so that the pulleys or sheaves, together with the rope or cord, perform the function of brake in connection with the cross-head of the hook, substantially in the manner hereinbefore set forth.

3. The movable cam-lever or catch, whether operated by the rope or otherwise, under the arrangement described, so as to prevent brake action, in the manner and for the purpose set forth.

In testimony whereof I have signed my name to this specification before two subscribing witnesses.

JAMÉT.

Witnesses:
 G. EORTIER,
 EDWARD TUCK.